United States Patent
Bauch et al.

(10) Patent No.: US 9,124,164 B2
(45) Date of Patent: Sep. 1, 2015

(54) DEVICE FOR FIXING MAGNETS

(75) Inventors: Christa Bauch, Grossbottwar (DE);
Martin Schulz, Kornwesthelm (DE);
Oliver Eckert, Remseck (DE);
Ngoc-Thach Nguyen, Grossbottwar (DE); Christian Dayan, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 508 days.

(21) Appl. No.: 13/125,620

(22) PCT Filed: Oct. 26, 2009

(86) PCT No.: PCT/EP2009/064083
§ 371 (c)(1),
(2), (4) Date: Oct. 18, 2011

(87) PCT Pub. No.: WO2010/046501
PCT Pub. Date: Apr. 29, 2010

(65) Prior Publication Data
US 2012/0032548 A1     Feb. 9, 2012

(30) Foreign Application Priority Data
Oct. 24, 2008 (DE) .......................... 10 2008 043 144

(51) Int. Cl.
*H02K 1/28* (2006.01)
*H02K 21/04* (2006.01)

(52) U.S. Cl.
CPC .................................... *H02K 21/044* (2013.01)

(58) Field of Classification Search
CPC .................................................. H02K 21/044
USPC ............. 310/156.16, 156.22, 156.66, 156.72, 310/156.73, 263
See application file for complete search history.

(56) References Cited

U.S. PATENT DOCUMENTS

| | | | | |
|---|---|---|---|---|
| 2,196,189 A | * | 4/1940 | Bott | ................................ 310/22 |
| 3,790,830 A | * | 2/1974 | Bonfiglio | ................. 310/156.16 |

(Continued)

FOREIGN PATENT DOCUMENTS

| DE | 19951115 | 5/2001 |
|---|---|---|
| DE | 10318636 | 3/2004 |

(Continued)

OTHER PUBLICATIONS

Translation of foreign document De 102006041981 Al (Year 2008).*

(Continued)

*Primary Examiner* — Alex W Mok
(74) *Attorney, Agent, or Firm* — Michael Best & Friedrich LLP

(57) ABSTRACT

The invention relates to an electric machine (10), in particular a generator for a motor vehicle, comprising an exciter system composed of a plurality of electrically excited salient poles. The salient poles can be designed within the stator (16) or rotor (20) in the form of electromagnetically excited poles (22, 23; 24, 25) which are axially and radially oriented on the periphery and are alternatively polarized in the peripheral direction. In order to improve performance and reduce the magnetic leakage flux, permanent magnets (66), which are secured by means of a magnetically non-excitable holding element (60), are inserted into interstices (74) between the alternating poles (24, 25). The holding element (60) is bilaterally mounted in pole grooves (92, 94), is radially, axially, and tangentially resilient, and has a wave-shaped (62) and/or bead-shaped (76, 78; 86) profile.

4 Claims, 17 Drawing Sheets

(56) References Cited

U.S. PATENT DOCUMENTS

| | | | |
|---|---|---|---|
| 4,594,525 A * | 6/1986 | Stokes | 310/156.13 |
| 4,625,392 A * | 12/1986 | Stokes | 29/598 |
| 4,683,393 A * | 7/1987 | Stokes | 310/156.13 |
| 4,746,827 A * | 5/1988 | Ochiai et al. | 310/156.22 |
| 4,850,100 A * | 7/1989 | Stokes | 29/596 |
| 4,859,892 A * | 8/1989 | Shiroyama | 310/154.17 |
| 5,306,977 A * | 4/1994 | Hayashi | 310/263 |
| 5,483,116 A * | 1/1996 | Kusase et al. | 310/263 |
| 5,907,209 A * | 5/1999 | Ishida | 310/263 |
| 5,973,435 A * | 10/1999 | Irie et al. | 310/263 |
| 6,150,746 A * | 11/2000 | Lechner | 310/181 |
| 6,333,582 B1 | 12/2001 | Asao et al. | 310/263 |
| 6,369,485 B1 * | 4/2002 | Oohashi et al. | 310/263 |
| 6,548,935 B1 * | 4/2003 | Shendi et al. | 310/263 |
| 6,744,165 B2 * | 6/2004 | York | 310/156.72 |
| 6,833,651 B2 * | 12/2004 | Pflueger | 310/263 |
| 6,924,580 B2 * | 8/2005 | Tajima et al. | 310/263 |
| 7,545,074 B2 * | 6/2009 | Maekawa et al. | 310/263 |
| 7,569,960 B2 * | 8/2009 | Hirabayashi | 310/154.08 |
| 7,784,168 B2 * | 8/2010 | Ooiwa | 29/598 |
| 2002/0011757 A1 | 1/2002 | Tanaka et al. | 310/263 |
| 2002/0117934 A1 * | 8/2002 | Kanazawa et al. | 310/263 |
| 2002/0117935 A1 * | 8/2002 | Kanazawa et al. | 310/263 |
| 2003/0080640 A1 * | 5/2003 | Weiglhofer et al. | 310/156.12 |
| 2004/0032183 A1 | 2/2004 | Nakamura | |
| 2004/0178696 A1 * | 9/2004 | Tajima et al. | 310/263 |
| 2006/0284580 A1 | 12/2006 | Kitamura | |
| 2007/0228866 A1 * | 10/2007 | Nakamura | 310/263 |
| 2007/0262672 A1 * | 11/2007 | Maekawa et al. | 310/263 |
| 2008/0018191 A1 * | 1/2008 | Nakamura | 310/156.66 |
| 2008/0048516 A1 * | 2/2008 | Oowatari et al. | 310/156.71 |
| 2008/0104826 A1 * | 5/2008 | Ooiwa | 29/598 |
| 2008/0157620 A1 * | 7/2008 | Longo et al. | 310/156.78 |
| 2008/0216962 A1 * | 9/2008 | Steinke et al. | 156/414 |
| 2008/0290755 A1 * | 11/2008 | Taruta et al. | 310/263 |
| 2009/0033167 A1 * | 2/2009 | Bradfield | 310/156.23 |
| 2009/0189472 A1 * | 7/2009 | Koumura et al. | 310/156.72 |

FOREIGN PATENT DOCUMENTS

| | | |
|---|---|---|
| DE | 102006041981 | 3/2008 |
| EP | 0837538 A1 * | 4/1998 |
| EP | 0991162 | 4/2000 |
| JP | 2005080472 | 3/2005 |
| JP | 2005509392 | 4/2005 |

OTHER PUBLICATIONS

PCT/EP2009/064083 International Search Report.

* cited by examiner

Fig. 18
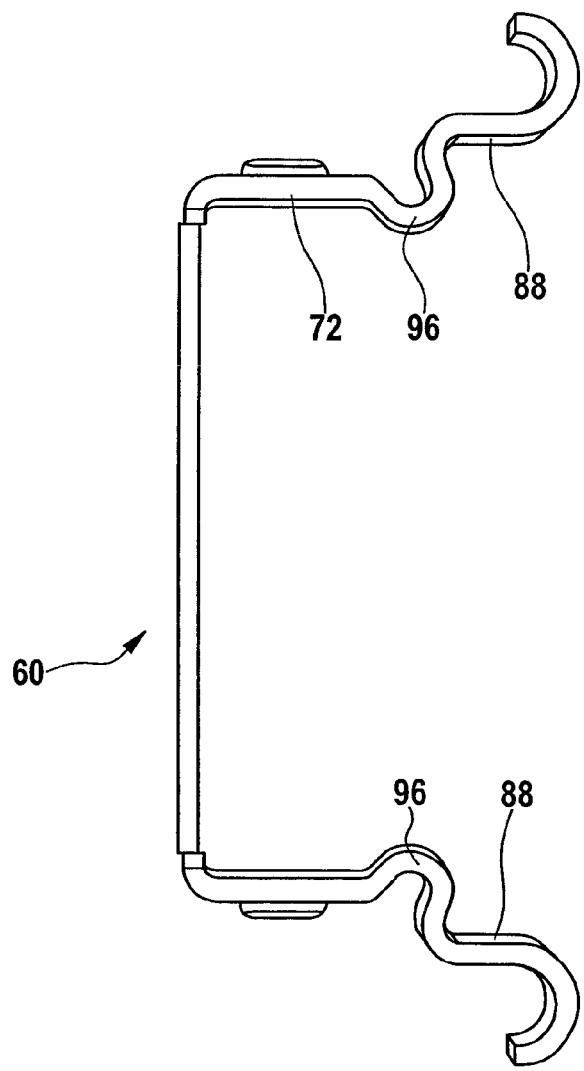
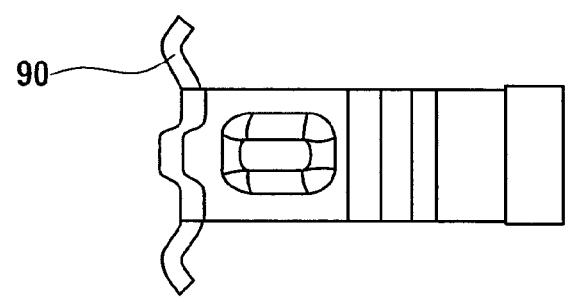

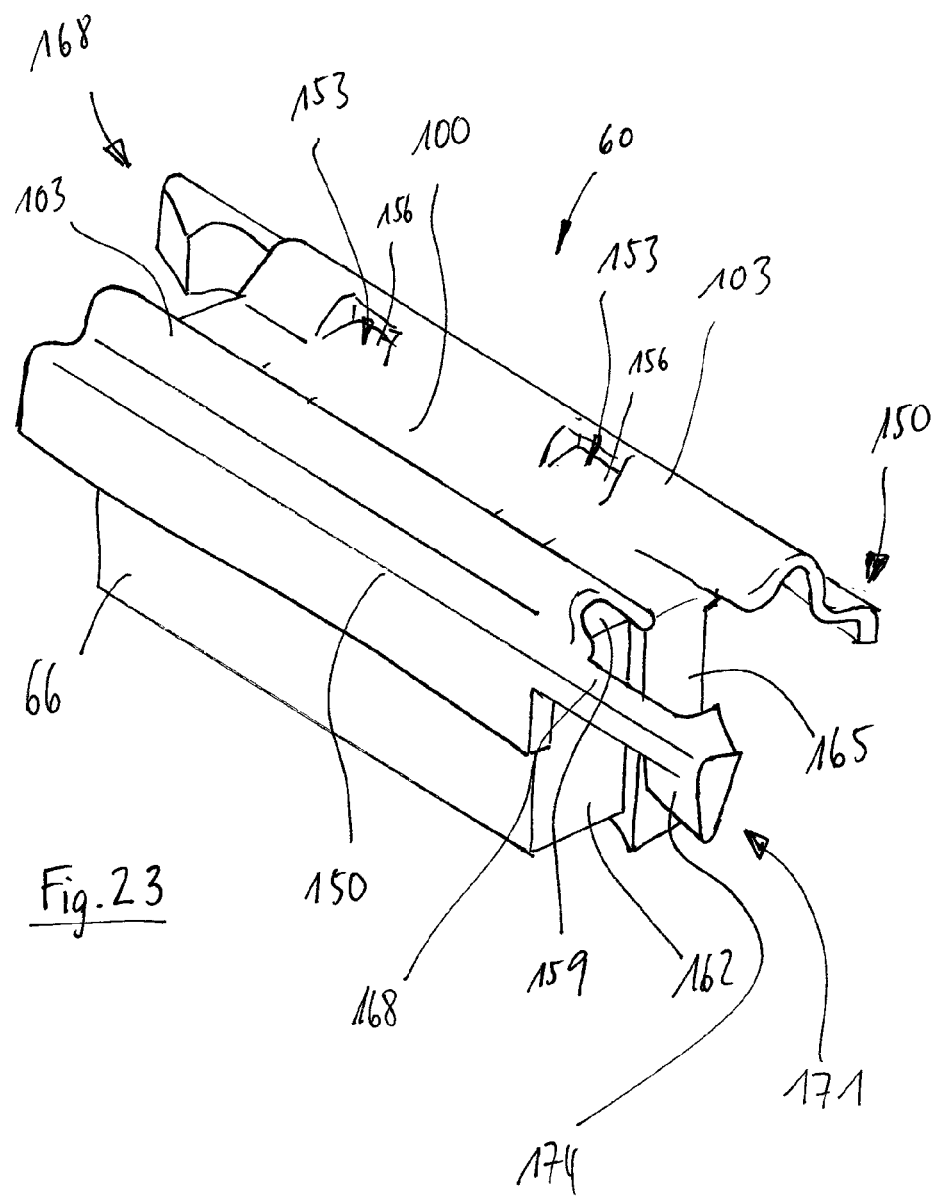

DEVICE FOR FIXING MAGNETS

BACKGROUND OF THE INVENTION

The German patent publication DE 10 2006 041 981 A1 relates to an electric machine. The electric machine relates particularly to an electrically excited claw-pole generator for a motor vehicle. The claw-pole generator comprises a rotor having a plurality of axially oriented poles which alternate magnetization in the peripheral direction and permanent magnets disposed between the poles for increasing performance and reducing the magnetic leakage flux. The permanent magnets are secured by means of non-magnetic plates bilaterally held in pole grooves. These plates comprise in each case at least one additional locking mechanism with which they are supported in the axial direction at the poles. The additional locking mechanisms are, for example, designed as sheet metal tabs which are bent or angled and are supported in a resiliently clamping manner at least one axial end section of the poles.

The German patent publication DE 199 51 115 A1 likewise relates to an electric machine. This electric machine relates to a generator for a motor vehicle having an exciter system and a plurality of electrically excited salient poles in the stator or rotor. The stator as well as the rotor thereby comprises the form of electromagnetically excited poles which are axially oriented on the periphery and are alternatively polarized in the peripheral direction. In order to reduce magnetic leakage flux, permanent magnets are situated in the interstices between the poles. The permanent magnets are inserted into the aforementioned interstices. Said permanent magnets on the stator, respectively the rotor, are secured in such a way that they are in each case held by means of a magnetically non-excitable holding element. This holding element is bilaterally mounted in pole grooves in the tangential and axial directions by means of caulking; and a pole groove is longitudinally incorporated into one pole and a pole groove is longitudinally incorporated into an opposite pole. In the case of a rotor, the holding element covers the respective permanent magnet in the radial direction to the stator or in the case of a stator in the radial direction to the rotor with a base section. Bent tabs, which exert a clamping force on axial front faces of the inserted permanent magnets, are located at each of the opposite ends of the base section.

In the case of electric machines as those known from the German patent publications DE 19 2006 041 981 A1 and DE 199 51 115 A1, the claw poles of a claw-pole machine tend to bend up radially outwards at high rotational speeds >20,000 rpm. This deformation occurs more or less dramatically, in each case depending on the rotational speed of the electric machine.

SUMMARY OF THE INVENTION

In order to lock the permanent magnets in place, resiliently embodied holding elements in the form of corrugated sheet are introduced in guide grooves on the sides of the claws. Said holding elements are capable of compensating very well for the installation tolerances and are able themselves to find the groove, in which said resiliently embodied holding elements are to be mounted, by means of an insertion tongue centrally positioned in relation to the interstice. This substantially eases assembly. An embodiment option, wherein the grooves are configured to run continuously in the axial direction, permits the permanent magnets having a resiliently embodied holding element to be inserted into the already completely assembled rotor. If the grooves are not manufactured to run continuously, bilateral, axial stops are then defined on the claw-pole flanks. In this case, a paired construction having a small connecting plate around the claw tip of a claw pole can occur.

The magnets are fixed axially by means of the holding elements, which are resiliently embodied in the form of corrugated sheet, and fixed and positioned in the radial direction. The resiliently embodied holding elements relate preferably to those which have a pattern in the form of corrugated sheet and have lateral corrugations. Despite the thin wall thickness, this embodiment provides a very good rigidity against bending as protection for the magnets against the very high centrifugal forces occurring at high speed. Due to said thin wall thickness manufactured into the holding elements resiliently embodied in the form of corrugated sheet, the dead load is very slight. The spring properties, i.e. the elasticity of the resiliently embodied holding element, allows for an exact positioning and fixing thereof. The resiliently embodied holding element correspondingly formed from non-electromagnetic spring material prevents electromagnetic short circuits. The electric machine proposed according to the invention has substantially reduced losses in performance due to smaller air gaps and a large two-dimensional overlapping between magnets and claw flanks. The durability of the electric machine against mechanical, electrical and thermal stresses is considerably increased. As a result of the definable positioning, relative small mechanical and electromagnetic imbalances occur and thereby reduced noise emissions ensue on account of a high degree of accuracy in the axial, radial and tangential positioning of the permanent magnets. The solution proposed according to the invention opens the possibility of magnetizing said magnets after assembly.

Due to the design of the holding element resiliently embodied in the form of corrugated sheet and the manufacture thereof from non-electromagnetic material, a resilient axial and radial positioning and fixing of the permanent magnets is achieved by the resilient holding elements laterally formed in the manner of a corrugated sheet in the preassembled as well as assembled state. An increase in performance, respectively a minimization of the losses can be achieved by large, lateral, easily accessible magnetic surfaces, which substantially abut against the sides of the claws.

In a first embodiment option, the holding elements proposed according to the invention, which are substantially configured in the form of corrugated sheet and resiliently embodied, can be used for block-shaped magnets without interior front faces of the claws. These magnets have linear supports in the radial direction. This design leads to a good distribution of the centrifugal force load and places reduced rigidity demands on the resiliently embodied holding elements. The number and configuration of the corrugations can be easily varied depending on the length of the magnet.

In a second embodiment, the holding plates comprise longitudinally formed, respectively indented or impressed, surfaces, which provide a support plane for the magnets against the risk of breakage at high centrifugal force loads.

Obliquely chamfered surfaces of the magnets, which substantially correspond to the claw contours, provide additional advantages with regard to material savings as well as to a reduction in the centrifugal forces which occur. The possible modifications result from the fact that resiliently embodied holding elements can be configured in V-form for two magnet assemblies or alternatively as a continuously embodied annulus with all of the magnets.

Integrally formed parallel longitudinal grooves, respectively longitudinal beads, provide a very good rigidity, respectively high bending moment of inertia, against bending as a protection of the magnets against the very high centrifugal forces which occur.

BRIEF DESCRIPTION OF THE DRAWINGS

The invention is explained below in more detail with the aid of the drawings.

The following are shown.

DETAILED DESCRIPTION

Figure 1:
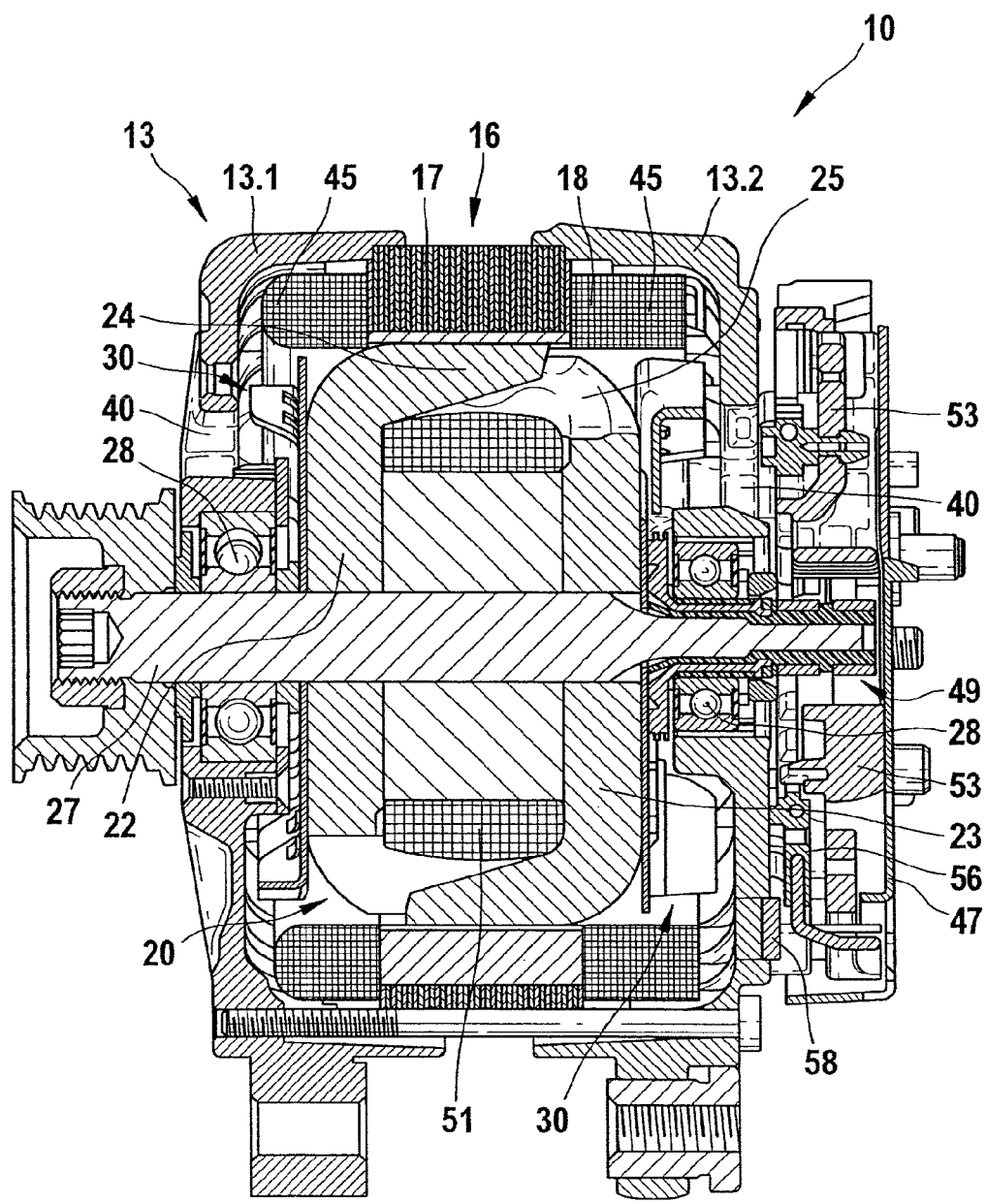
FIG. 1 a sectional view through an electric machine, in particular a generator.

In FIG. 1 a cross-section through an electric machine 10 can be seen, embodied here as a generator, respectively alternator, for motor vehicles. This electric machine 10 includes among other things a two-parted housing 13, which comprises a first end shield 13.1 as well as a second end shield 13.2. The first end shield 13.1 and the second end shield 13.2 contain a stator 16, which on the one hand consists substantially of a circularly annular stator iron core 17 and a stator winding 18 is inserted, respectively fed, into the grooves thereof which are directed radially inwards and extend axially. The annular stator 16 encloses a rotor 20, which is embodied as a claw-pole armature, with the grooved surface thereof which is directed radially inwards. The rotor 20 comprises among other things two claw-pole plates 22 and 23, on whose outside periphery claw-pole fingers 24, 25 are arranged, which extend in the axial direction or are configured to be bent. Both claw-pole plates 22 and 23 are disposed in the rotor 20 in such a way that the claw-pole fingers 24 and 25 thereof, which extend in the axial direction, alternate with one another about the periphery of said rotor 20. As a result, magnetic, essential interstices or separating spaces between the mutually magnetized claw-pole fingers 24 and 25 arise, which are denoted as claw-pole interstices. Said rotor 20 is supported by means of a shaft 27 and in each case a roller bearing 28 situated on each side of said rotor 20 in the respective end shields 13.1 and 13.2.

The rotor 20 comprises altogether two axial front faces, to which in each case a fan is attached. This fan 30 consists substantially of a wave plate-shaped or disk-shaped section, from which fan blades emanate in a known way. These fans 30 serve to facilitate an air exchange between the exterior of the electric machine 10 and the interior of said electric machine 10 via openings 40 in the end shields 13.1 and 13.2. For this purpose, the openings 40 are provided substantially on the axial ends of the end shields 13.1 and 13.2. Cool air is drawn by said fans 30 into the interior of said electric machine 10 via said openings 40. This cool air is accelerated radially outwards by the rotation of said fans 30; thus enabling said cool air to flood through the winding overhang 45. Said winding overhang 45 is cooled by means of this effect. After flooding through said winding overhang 45 or as the case may be flowing around said winding overhang 45, the cool air takes a course radially outwards through openings not depicted here in FIG. 1.

A protective cap 47 is situated on the right side, which protects various components from environmental influences. This protective cap 47 covers, for example, a slip ring assembly 49, which serves the purpose of supplying an excitation winding 51 with an exciting current. A cooling body 53 is arranged around this slip ring assembly 49, which in this case acts as a plus cooling body. The end shield 13.2 acts as a so-called minus cooling body. A connecting plate 56 is located between said end shield 13.2 and the cooling body 53 and is used to connect the minus diode 58 disposed in said end shield 13.2 to plus diodes, which are not shown here in this depiction, in said cooling body 53 and thus to form a bridge circuit.

Figure 2:
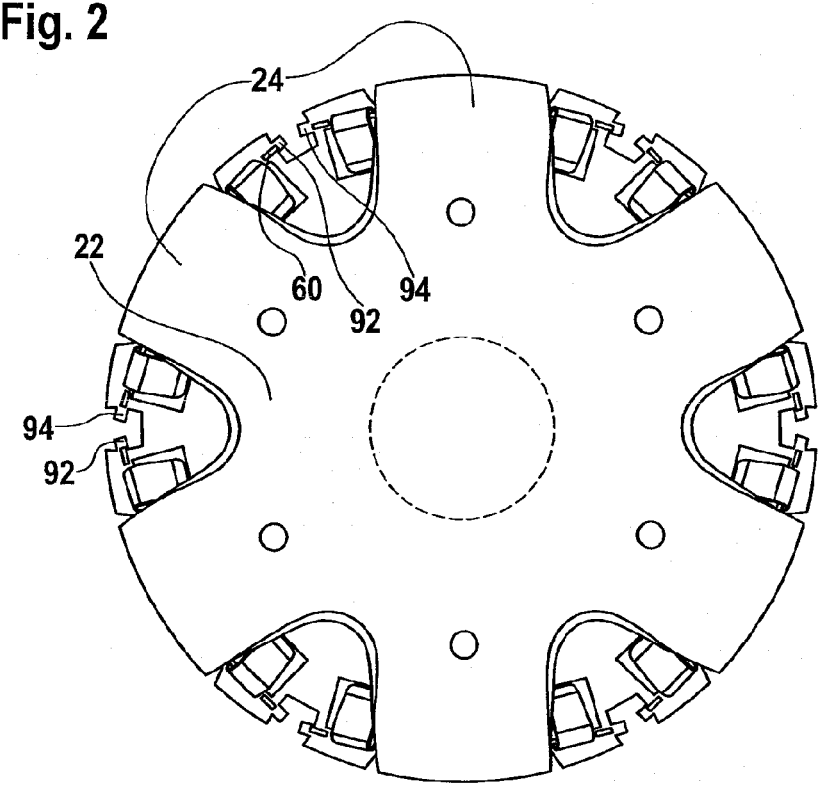
FIG. 2 a frontal view of the claw pairing of the rotor, respectively the armature, FIG. 3 a top view, respectively side view, of the claw-shaped pole arrangement, FIG. 4 a detailed view of the permanent magnets which are fixedly secured by resiliently embodied holding elements, FIG. 5 a view of the permanent magnets with the holder, FIG. 6 a wave-shaped structure of the resiliently embodied holding elements, FIG. 7 the block-shaped permanent magnet as well as the resiliently embodied holding element engaging over said magnet, FIG. 8 a perspective depiction of the top view according to FIG. 3 in an enlarged scale, FIG. 9 a further embodiment option of the permanent magnets, for example, resiliently embodied holding elements for fixation, FIG. 10 a view from below, FIG. 11 an enlarged perspective top view of the resiliently embodied holding element according to the embodiment option in FIG. 9, FIG. 12 a side view of the arrangement depicted in FIG. 11, FIG. 13 a side view only of the resiliently embodied holing element according to the embodiment option in FIG. 9, FIG. 14 a top view of the resiliently embodied holding element, FIG. 15 a view of the laterally bent sections of the same, FIG. 16 a claw half shell of the electric machine having the embodiment option for radial installation, FIG. 17 a top view of a further embodiment of the double resiliently embodied holding elements for fixing the permanent magnets, FIG. 18 side view and top view of the embodiment option of the resiliently embodied holding elements according to FIG. 17 and FIG. 19 a top view of a resiliently embodied holding element provided with longitudinal beads, FIGS. 20 A and B a spatial view of a partial section of a further exemplary embodiment of a holding element, FIGS. 21 A and 21 B two views of a further exemplary embodiment of a holding element, FIGS. 22 A and 22 B two views of a further exemplary embodiment of a holding element, FIG. 23 a spatial view of a further exemplary embodiment of a holding element.

A top view of a rotor block of the electric machine 10 can be seen in the depiction pursuant to FIG. 2.

Figure 3:
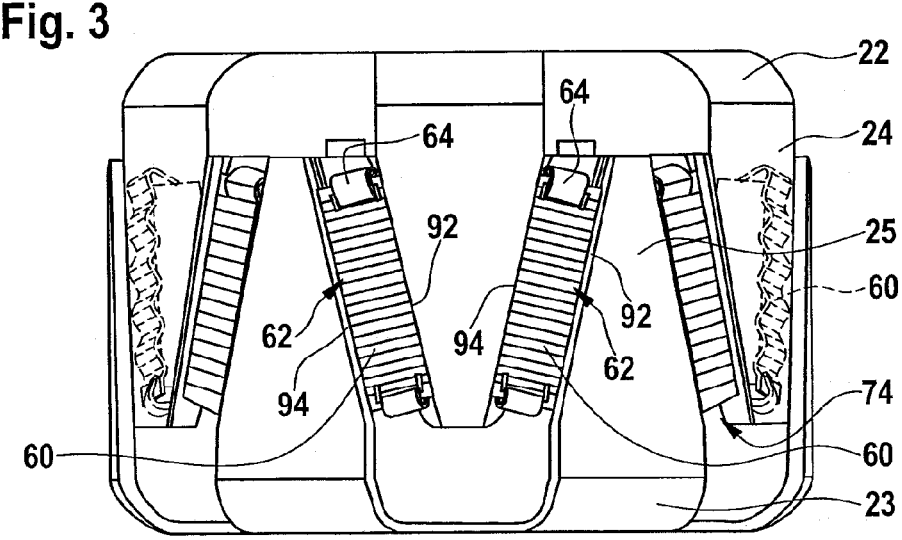

In the depiction pursuant to FIG. 2, the claw-pole plate 22 of the rotor 20 is illustrated, from which the claw-pole fingers denoted with the reference numeral 24 extend into the drawing plane. Interstices 74, in which permanent magnets 66 are disposed and which can be seen in FIG. 3, are situated between the individual and conically configured claw-pole fingers 24. The permanent magnets 66 (FIG. 4) are used for the reduction of the magnetic leakage flux. Said permanent magnets 66 are affixed in the interstices 74 between the individual claw-pole fingers 24 and 25 of the electric machine 10 by means of holding elements 60, which are resiliently embodied according to the invention. For this purpose, the resiliently embodied holding elements 60 proposed according to the invention are inserted into pole grooves 92, 94 which face each other, as indicated in the frontal view in FIG. 2. The pole grooves 92 and 94 are substantially configured as slots and extend in the axial direction along the conically designed pole finger flanks into the drawing plane pursuant to the depiction in FIG. 2.

The top view according to FIG. 3 shows that the rotor 20 of the electric machine 10 depicted there comprises two claw-pole plates 22, respectively 23, which are inserted into one another. Starting from the front faces of the claw-pole plates 22, 23, the individual claw-pole fingers denoted by the reference numerals 24, 25 extend in an alternating sequence. The interstices 74 extend between the claw-pole fingers 24, 25 pursuant to the depiction in FIG. 3. Said interstices 74 are bounded by pole grooves 92, 94 which face each other and are embodied in an alternating sequence in the sides of the claw poles fingers 24, respectively 25.

It can be seen in the depiction pursuant to FIG. 3 that holding elements 60 resiliently embodied according to the invention are inserted into the pole grooves 92, 94 between the individual claw-pole fingers 24, 25. The resiliently embodied holding elements 60 include in each case clamping brackets 64 of curved design, which in the top view pursuant to FIG. 3 affix the permanent magnet 66 covered by the resiliently embodied holding element 60. Due to the limitations of the drawn, visible representation, the permanent magnet 66 for reducing the magnetic leakage flux, which is affixed by each resiliently embodied holding element 60, is not depicted.

It can be seen in FIG. 3 that the individual, resiliently embodied holding elements 60 have a wave-shaped profile 62. The number and form of the waves are dependent upon the required length of the magnet, the required clamping force and the rotational speed of the electric machine. The wave-shaped profile 62 extends in the axial direction of the resiliently embodied holding element 60 from a clamping bracket 64 up to the opposite resiliently embodied clamping bracket 64. By means of the resiliently embodied clamping brackets 64, the permanent magnets 66 are fixed on the respective front faces thereof and fit snugly with at least one longitudinal side against the bottom side of said resiliently embodied holding element 60.

It is indicated in the depiction pursuant to FIG. 3 that the resiliently embodied holding elements 60 have been inserted into the pole grooves 92, 94. For that reason, said resiliently embodied holding elements 60 are configured wider with regard to the width thereof in relation to the width of the clamping brackets 64; thus enabling the edge areas of the resiliently embodied holding elements 60, which run laterally, to project into the respective pole grooves 92, 94 and a reliable mechanical fixing of the permanent magnets 66 to be facilitated even at high and the highest rotational speeds of the electric machine 10.

Figure 4:
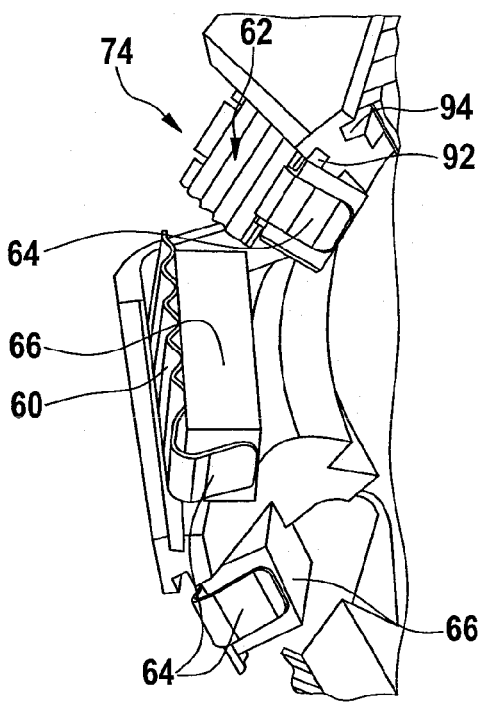

FIG. 4 shows a perspective view of the permanent magnets 66 affixed by the resiliently embodied holding elements 60.

It can be seen in the depiction pursuant to FIG. 4 that the resiliently embodied holding elements 60 fix the permanent magnets 66 at the front faces 70 thereof by means of the clamping brackets 64. Due to the widened configuration of the resiliently embodied holding element 60, the edge regions thereof are inserted into the pole grooves 92, 94 depicted in FIG. 4, which are configured in the individual claw-pole fingers 24, respectively 25, and reliably anchored there. During a rotation of the electric machine 10, i.e. of the rotor 20, said resiliently embodied holding elements 60 form a reliable, mechanical, loss-proof fixing of said permanent magnets 66, which abut snugly against the bottom side 72 of said resiliently embodied holding elements 60 during a rotation of said rotor 20 of said electric machine 10.

Figure 5:
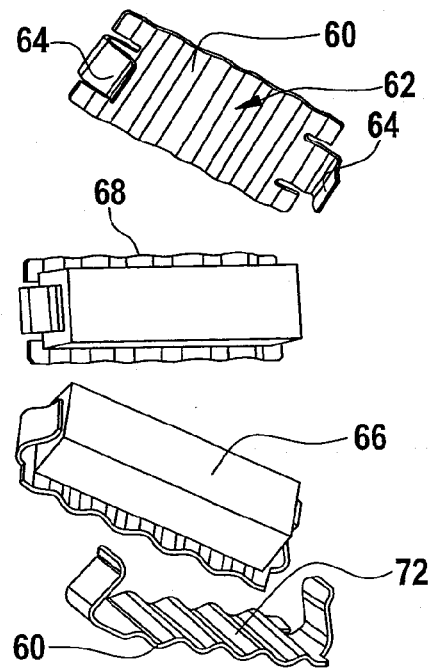

It can be seen in FIG. 5 that the permanent magnets 66 are configured block-shaped and that the resilient clamping brackets 64 clamp the opposing front faces 70 of a permanent magnet 66 to be fixed in place. The permanent magnet 66 rests, as can be seen in FIG. 5, with at least one of the longitudinal sides 68 thereof against the bottom side 72 of the resiliently embodied holding element 60. As FIG. 5 furthermore shows, the width of said resiliently embodied holding element 60 exceeds the width of said permanent magnet 66 to be fixed in place. The reason for this is that said resiliently embodied holding element 60 is inserted with the lateral edges of the wave-shaped 62 profile thereof into the pole grooves 92, 94 of the claw-pole fingers 24, 25. Said wave-shaped 62 profile advantageously facilitates the reception of elastic deformations of said claw-pole fingers 24, 25 at high rotational speeds as well as a compensation of deformations, which occur as a result of centrifugal force load. In so doing, the mechanical load has been taken off said permanent magnets 66 fixed in place by said resiliently embodied holding elements 60 proposed by the invention. Deformations occurring due to thermally related stresses, even those occurring in said claw-pole fingers 24 or 25, can also be easier absorbed on account of the profiled design of said resiliently embodied holding elements 60 proposed according to the invention. Furthermore, a smaller mechanical imbalance can be achieved by means of the design of said resiliently embodied holding elements 60 proposed according to the invention, whereby a reduction in the noise level can also be achieved. The pole grooves 92 or 94 on the sides of the claw-pole fingers 24, 25 in the region of the interstices 74 are preferably formed by a cutting operation, can however also be formed without cutting on account of the resilient fitting.

Due to the fact that the clamping brackets 64 are configured on the resiliently embodied holding elements 60 so as to be centrally positioned in relation to the interstice 74, said holding elements 60 are well able to find the pole grooves 92, 94 themselves. This substantially eases assembly. If axially continuous grooves are installed on the claw-pole fingers 92, 94, the permanent magnets 66 mounted on the resiliently embodied holders 60 proposed according to the invention can be inserted into the completely assembled rotor 20. In the case of non-continuously embodied pole grooves 92, 94, bilateral, axial stops are defined by the flanks of the claw-pole fingers 24 or the two claw-pole plates 22, 23. The lateral corrugations of the wave-shaped 62 profile, which run parallel to one another and are formed in said holding elements 60, provide very good rigidity against bending as well as protection for the permanent magnet 66 positioned on the bottom side 72. Due to the thin wall thickness, the dead load is very slight and the resilient embodiment enables said magnets 66 to be precisely fixed and positioned. The resiliently embodied holding element 60 is preferably manufactured from non-electromagnetic and stainless material and enables a resilient, axial and radial positioning of said permanent magnets 66 in the interstices 74, whereby said permanent magnets 66 are to be secured and protected against centrifugal forces and corrosion.

Figure 6:
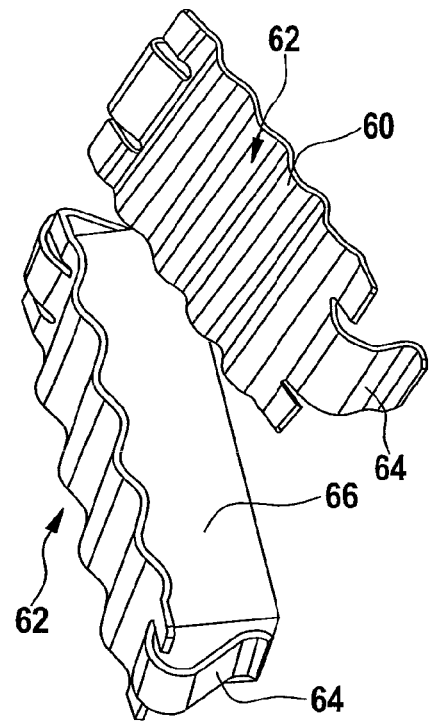

The depiction pursuant to FIG. 6 reveals how the permanent magnet 66 is affixed on the front faces 70 thereof by means of the clamping brackets 64 engaging over said front faces 70. Moreover, the wave-shaped profile is illustrated in the depiction pursuant to FIG. 6.

Figure 7:
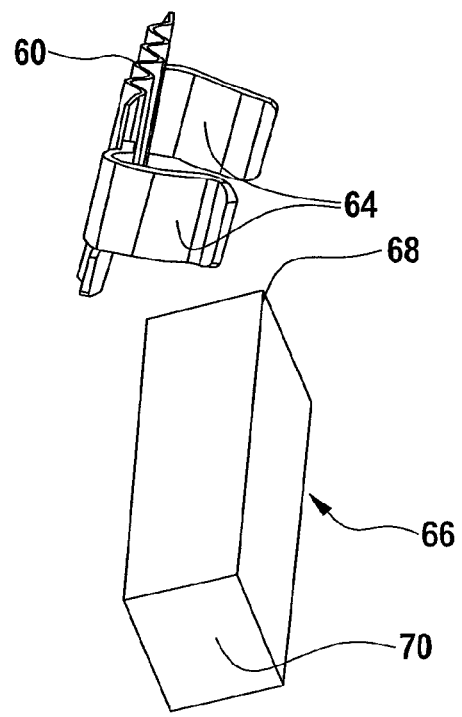

It can be seen in the depiction pursuant to FIG. 7 that the permanent magnet 66 can, for example, be configured block-shaped. The permanent magnets 66 can include linear supports which extend radially. This design provides good features for the distribution of the centrifugal force load, whereby the rigidity demands on the resiliently embodied holding element 60 can be reduced.

Figure 8:
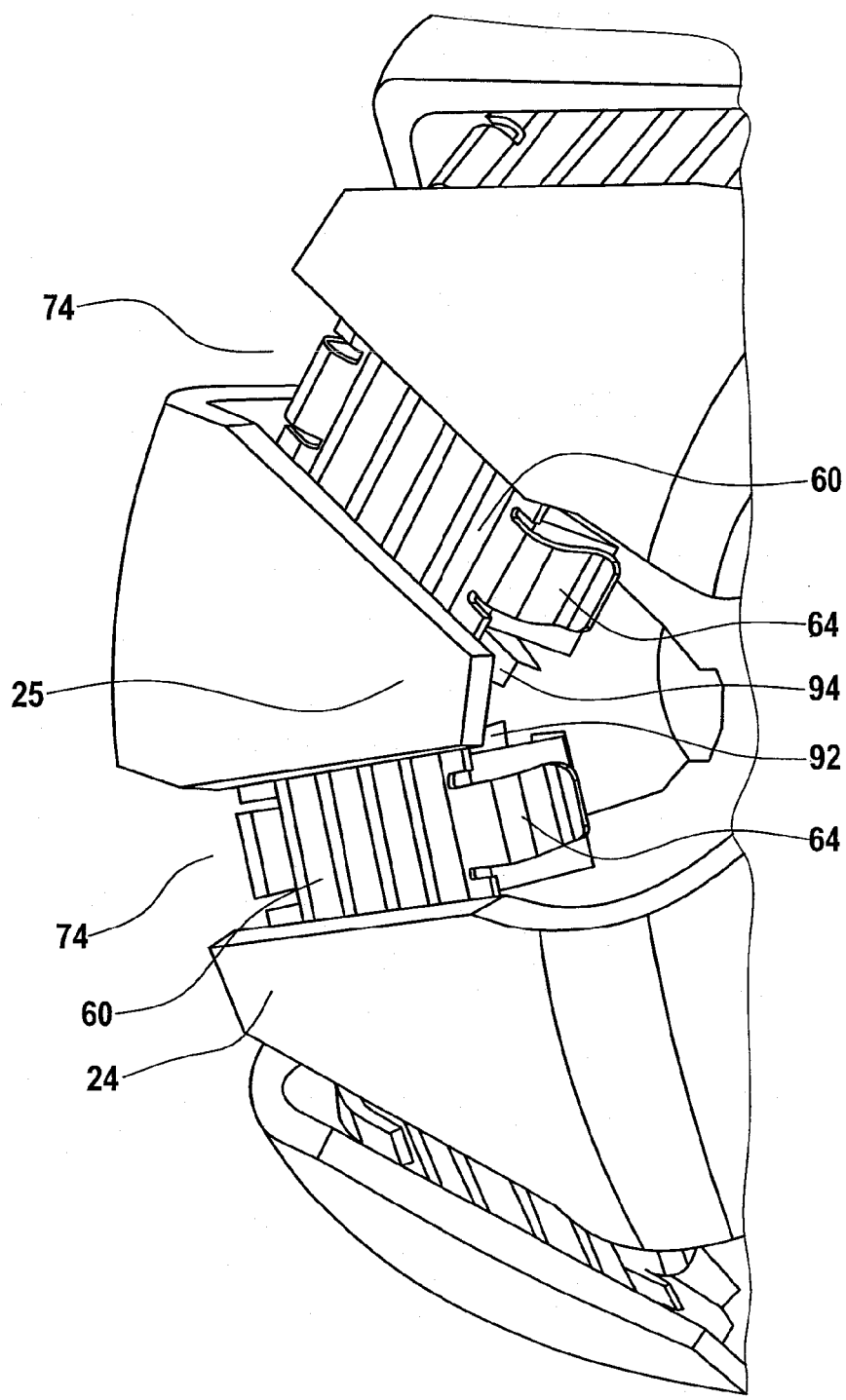

The depiction pursuant to FIG. 8 reveals how the resiliently embodied holding elements are inserted into the pole grooves 92, 94. Said pole grooves 92, 94 lie on the mutually facing lateral edges of the claw-pole fingers 24 or 25, which mutually face each other along the interstices 94.

Figure 9:
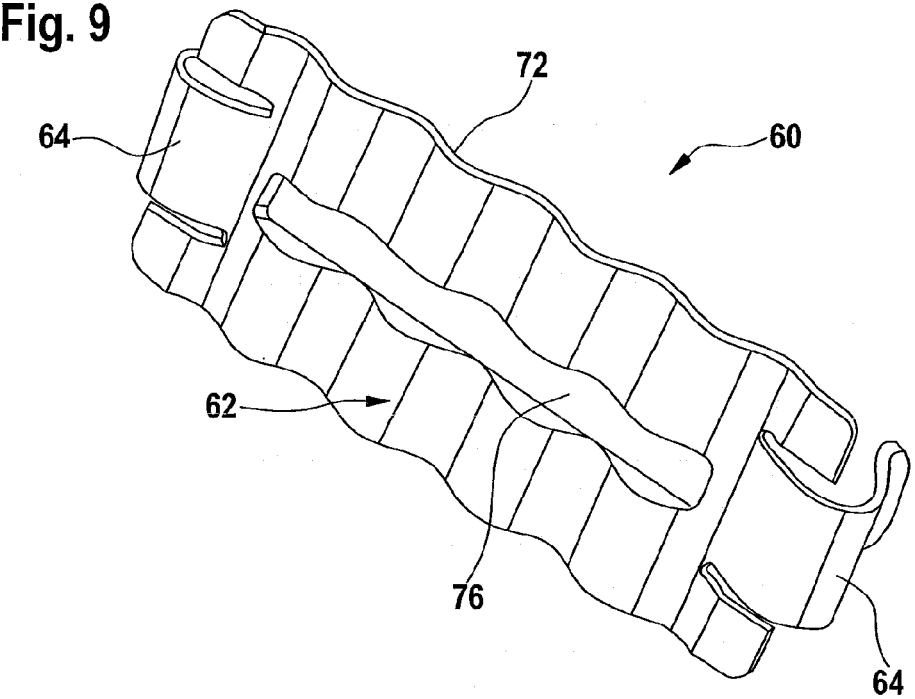

It can be seen in the depiction pursuant to FIG. 9 that the resiliently embodied holding elements 60 proposed according to the invention can include in a preferred embodiment of the same a longitudinal stiffener, as, for example, in the form of a longitudinal bead 76 in the region of their wave-shaped profile. Said depiction pursuant to FIG. 9 further reveals that the longitudinal bead 76 can be introduced into the surface of the holding element 62 having in this case a wave-shaped profile, as, for example, by punching/stamping or impressing. Pursuant to the depiction in FIG. 9, said longitudinal bead 76 extends from the center of one of the clamping brackets 64 to the center of the other clamping bracket 64.

Figure 10:
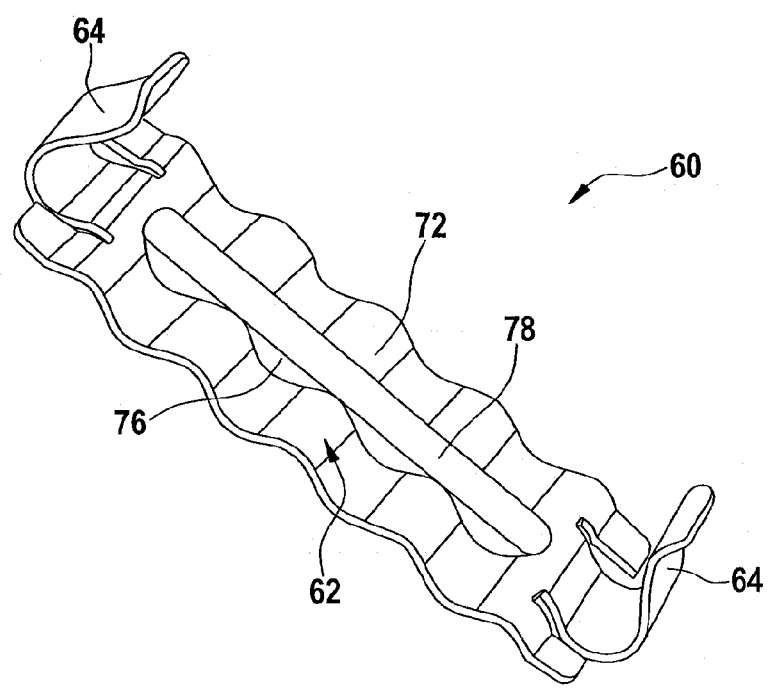

FIG. 10 shows that a stiffening bead base 78 extending in a planar manner results on the bottom side 72 of the resiliently embodied holding element 60 due to the stamping, respectively introducing, of the longitudinal bead 76 into the material thereof. Instead of the longitudinal bead 76 shown in the depictions pursuant to FIGS. 9 and 10, which is centrally introduced, respectively stamped, two adjacent or a plurality of longitudinal beads 76 extending in the longitudinal direction can also be designed into the resiliently embodied holding element 60 proposed according to the invention.

Figure 11:
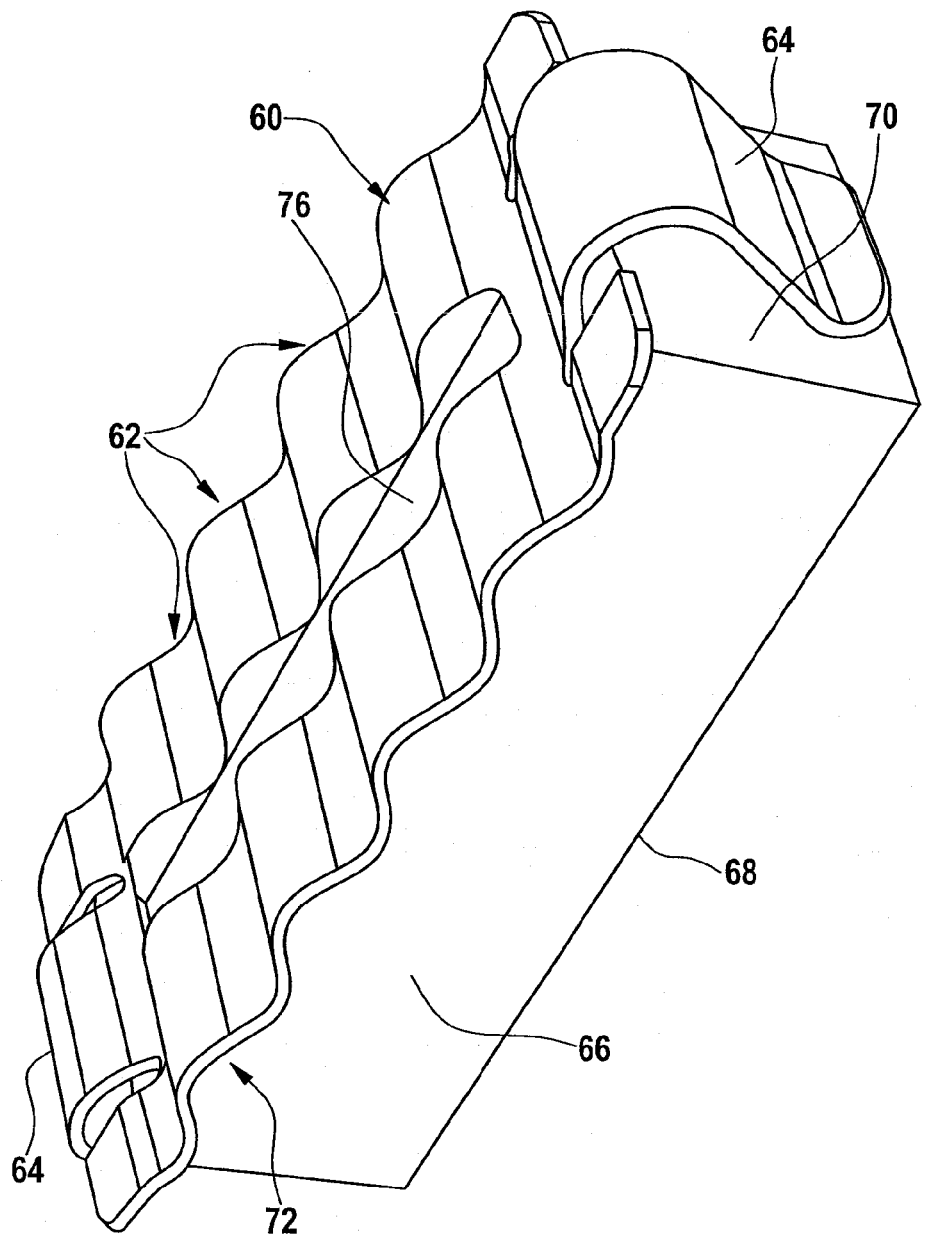

FIG. 11 shows that the longitudinal bead 76 extends from one of the clamping brackets 64 to the other clamping bracket 64 and that the permanent magnet 66, which in this instance is block-shaped, is fixed on the front faces thereof. Pursuant to the depiction in FIG. 10, said block-shaped permanent magnet 66 rests with one of the longitudinal sides 68 thereof against the bottom side of the planar stiffening bead base 78. This can be very well seen in the side views of the resiliently embodied holding element 60 proposed according to the invention pursuant to FIGS. 12 and 13.

Figure 12:
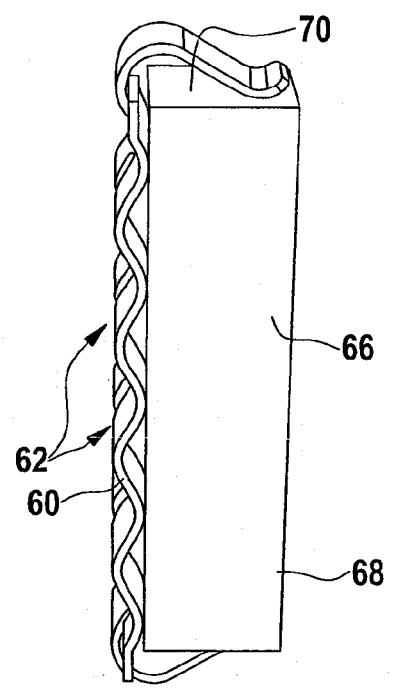

The depiction pursuant to FIG. 12 reveals that a longitudinal side 68 of the permanent magnet 66 fits snugly against the bottom side of the corrugated base 78 of the resiliently embodied holding element 60. The permanent magnet 66 is enclosed on the mutually opposing front faces 70 by the resiliently embodied clamping brackets 64.

Figure 13:
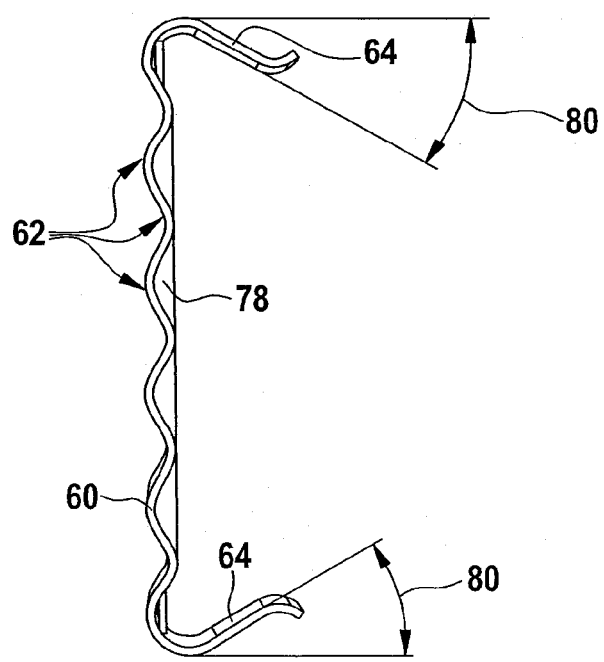

FIG. 13 shows that the clamping brackets 64 are bent at a bracket angle 80, which in relation to the stiffening bead base 78, i.e. the bottom side of the resiliently embodied holding element 60, lies in the range between 0° and 60°, preferably between 15° and 45°. The sides of the wave-shaped profile can be open or closed, as, for example, cast with a filling material. FIG. 13 shows that a stiffening bead base 78 extending in a planar manner results by virtue of introducing the longitudinal bead 76 into the wave-shaped 62 profile. Said stiffening bead base 78 constitutes a planar surface, against which at least one longitudinal side 68 of the permanent magnet 66 abuts snugly upon rotation of the rotor 20.

Figure 14:
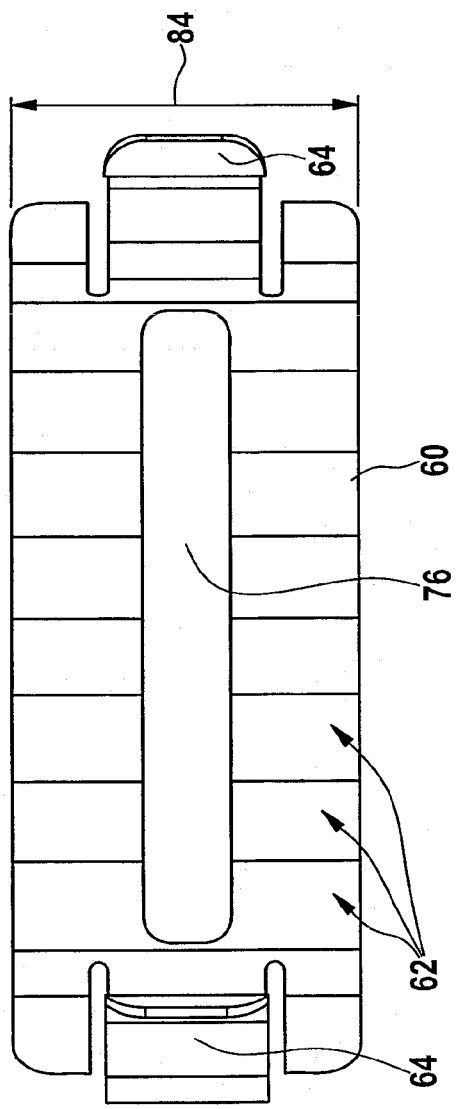

It can be seen in the top view pursuant to FIG. 14 that the longitudinal bead 76 has been introduced into the wave-shaped 62 profile. Edge regions of said wave-shaped 62 profile are inserted into the correspondingly configured pole grooves 92, 94 of the claw-pole fingers 24, 25 and therefore locked in place there. The depiction pursuant to FIG. 14 reveals that a width 84 of the resiliently embodied holding element 60 exceeds the width of the clamping bracket 64 (cf. depiction pursuant to FIG. 15). The lateral regions of said wave-shaped 62 profile facilitate the locking in place of said resiliently embodied holding element 60 in said pole grooves 92, 94 of said claw-pole fingers 24, 25.

Figure 15:
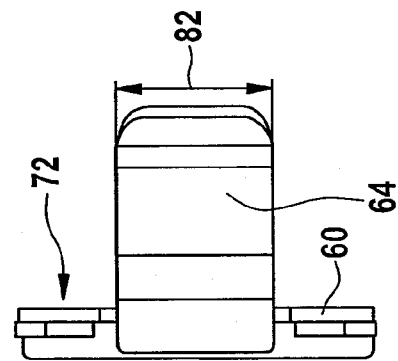

FIG. 15 shows that a clamping bracket width 82 of the clamping brackets 64 is approximately twice the size of the width 84 (cf. depiction pursuant to FIG. 14) of the resiliently embodied holding element 60. The clamping bracket width 82 is calculated such that it almost completely covers the front faces 70 of the permanent magnet 66 when the resiliently embodied holding element 60 is mounted in the pole grooves 92, 94. In so doing, a reliable fixing of said permanent magnet 66 in the interstices 74 between the claw-pole fingers 24, 25 is ensured even when high peripheral speed and high centrifugal forces occur.

Figure 16:
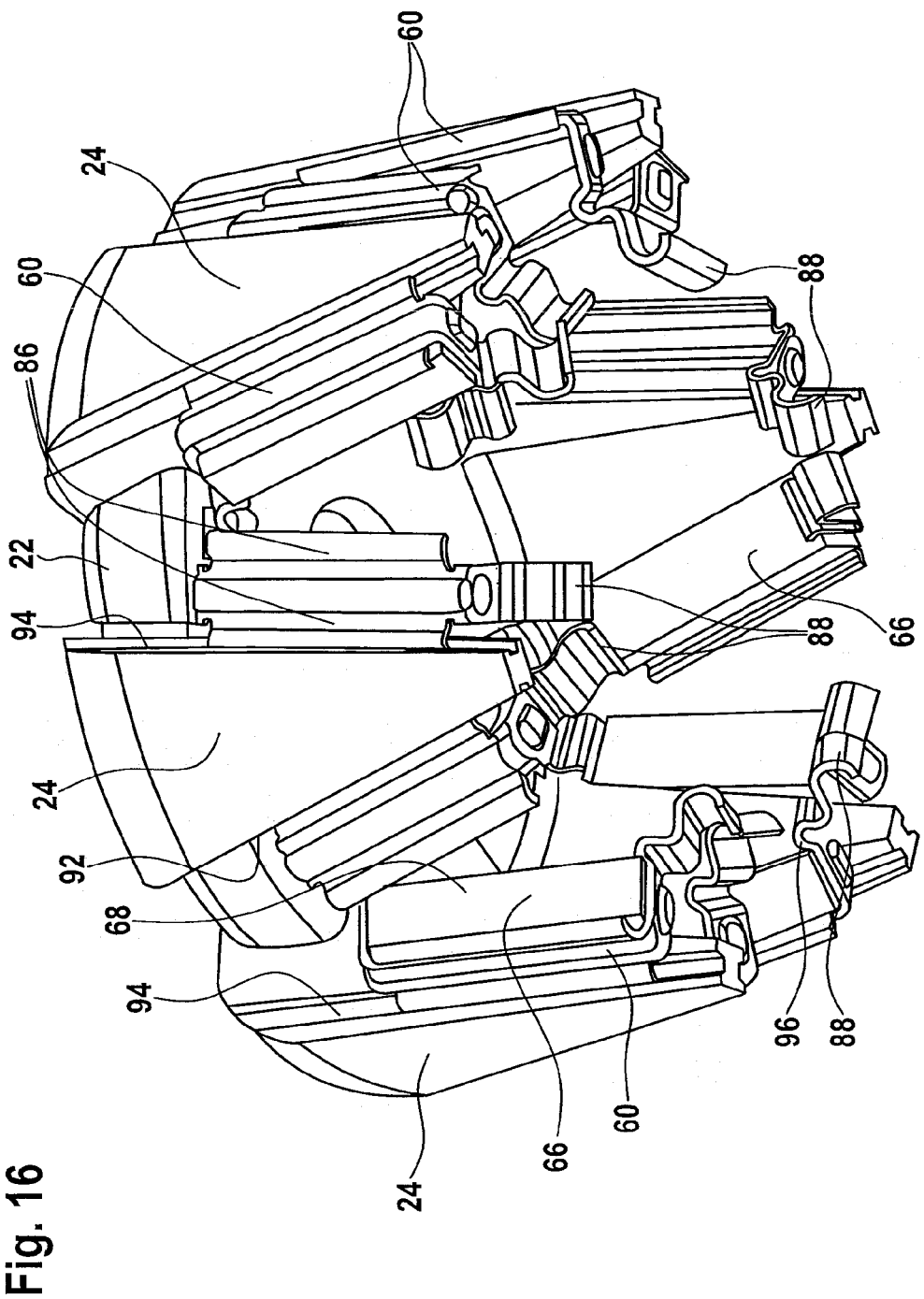

FIG. 16 shows a further embodiment option of the resiliently embodied holding element 60 proposed according to the invention. Provision is particularly made for this option in the case of radial mounting from above or from outside inwards of the finished rotor assemblies.

The depiction pursuant to FIG. 16 reveals that the claw-pole plate 22 comprises a number of claw-pole fingers 24, wherein corresponding clearances, in which the claw-pole fingers 24 of another claw-pole plate engage, are configured between said claw-pole fingers 24. For reasons of clarity, only one of the claw-pole plates 22, 23 is depicted in the perspective view pursuant to FIG. 16. In the depiction pursuant to FIG. 16, the permanent magnets 66 are likewise fixedly secured by resiliently embodied holding elements 60, which however in comparison to the first embodiment option of the resiliently embodied holding elements 60 depicted in FIG. 9 comprise a longitudinal ribbing 86 to prevent the magnets from buckling. It can be seen in FIG. 16 that the longitudinal ribbing 86 of the two recesses extending parallel to one another, i.e. the longitudinal beads 76, is depicted in the surface of said resiliently depicted holding elements 60 which covers said permanent magnets 66. Clamping projections 90, which engage in the pole grooves 92, 94 of said claw-pole fingers 24, 25 of said claw-pole plates, extend on both sides of said longitudinal ribbing 86.

In contrast to the first embodiment option of the resiliently embodied holding elements 60 depicted in FIGS. 9, 10, 11, 12, 13, 14 and 15, the resiliently embodied holding elements 60 pursuant to the depiction in FIG. 16 comprise hooks 88, wherein a magnet holder 96 is configured. The magnet holder 96 is embodied as an undercut; thus enabling the permanent magnets 66 to be easily clipped into said resiliently embodied holding elements 60 pursuant to the depiction in FIG. 16 and to immediately assume the installation position thereof. Said resiliently embodied holding elements 60 pursuant to the depiction in FIG. 16 are preferably mounted in the radial direction, i.e. starting from the outer periphery, into the interstices 74 between the individual claw-pole fingers 24 pursuant to the depiction in FIG. 16. Due to their elasticity, the hooks 88 snap into correspondingly configured undercuts of the first claw-pole plate 22 and are fixedly secured in a reliable manner even when high rotational speeds and thus high centrifugal forces occur by virtue of said hooks 88 abutting against the projection which is correspondingly configured to the geometry thereof.

Figure 17:
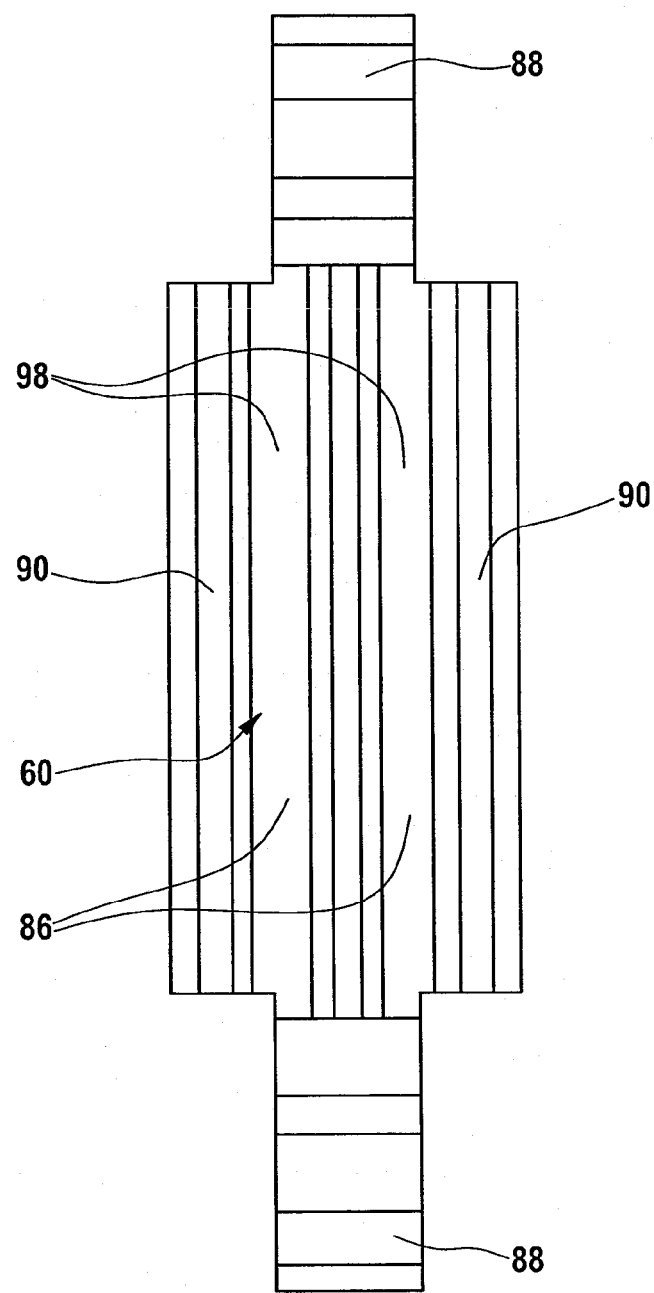
Figure 19:
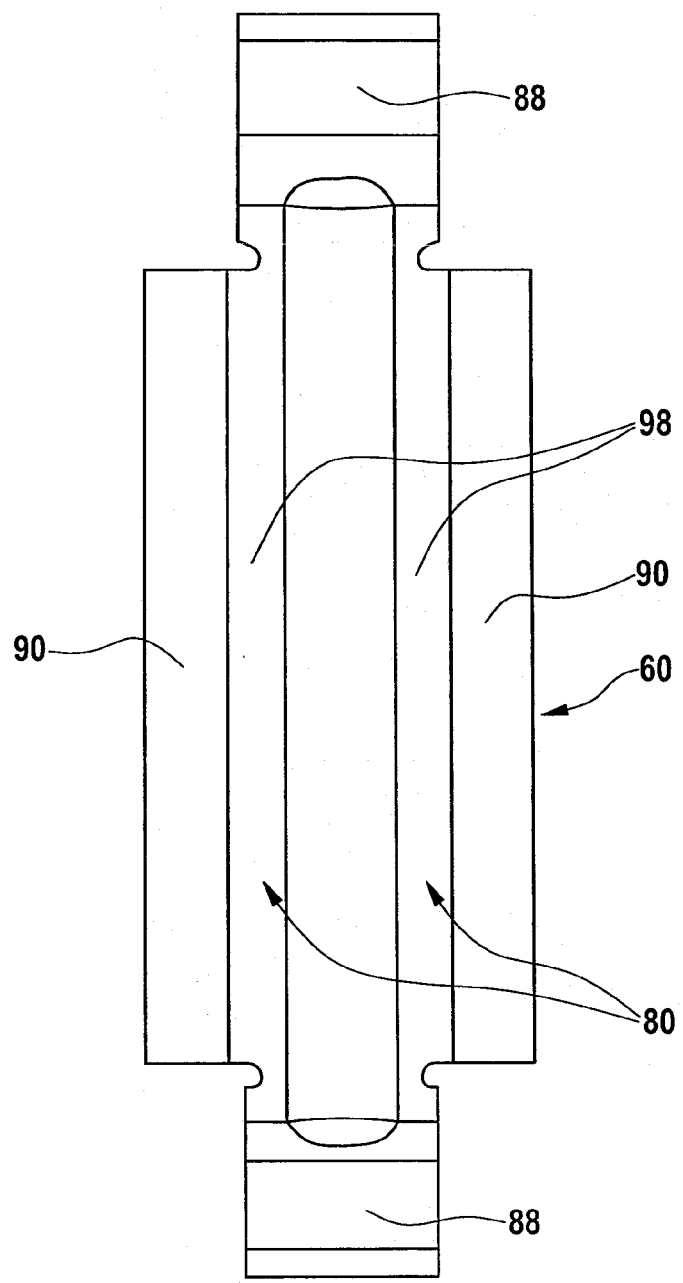

The further embodiment option of the resiliently embodied holding element is illustrated in detail in the depiction pursuant to FIGS. 17, 18 and 19.

FIG. 17 shows that a longitudinal ribbing 86, to which in each case a clamping projection 90 is attached, is configured on the longitudinal side 68 of the resiliently embodied holding element 60, wherein said longitudinal side 68 covers the permanent magnet 66. The clamping projection 90, which is embodied on the individual claw-pole fingers 24, 25 of the two claw-pole plates 22, 23, engages in the pole grooves 92, 94. It can be seen in the top view pursuant to FIG. 17 that the longitudinal ribbing 86 can, for example, comprise two beads 98 which extend from one hook 88 to the opposing hook 88.

It can be seen in FIG. 18 that a magnet holder 96 is situated above the hooks 88 for affixing the resiliently embodied holding elements 60 in the respective claw-pole plate 22, 23. The magnet holder 96 conveys the permanent magnet 66, which is to be pre-mounted and to be fixed by the resiliently embodied holding element 60, into a defined position and holds it there. FIG. 18 furthermore shows the clamping projections 90, which extend laterally and with which the further embodiment option of the resiliently embodied holding elements 60 proposed according to the invention and depicted in FIGS. 16, 17, 18 and 19 is fixedly secured in the interstices 74 of the claw-pole plates 22, 23.

It can be seen in the depiction pursuant to FIG. 19 that this further embodiment option of the resiliently embodied holding element 60 proposed according to the invention comprises two longitudinal beads 76 running symmetrically with respect to each other, which constitute the longitudinal ribbing 86. The resiliently embodied hooks 88 facilitate the reliable fixation of the resiliently embodied holding element 60, which is preferably formed as a retaining plate by stamping or punching, in the claw-pole plate 22 or 23.

Whereas permanent magnets 66 substantially embodied as block-shaped are depicted in FIGS. 5, 6, 7, 12 and 16, said magnets 66 can also be embodied in geometries deviating from the rectangular shape, as, for example, having chamfered surfaces. The geometry of the permanent magnets 66 is preferably selected such that they conform to the corresponding contour of the claw-pole fingers 24, 25. Two pairs of permanent magnet assemblies can thus be formed or a continuous annulus comprising all of said permanent magnets 66 can be realized via connecting plates, which enclose and give support beneath or centrally in recesses in the regions of the tips of said claw-pole fingers 24.

Whereas in the first embodiment of the resiliently embodied holding element 60 proposed according to the invention depicted in FIGS. 4 to 15 said holding element 60 is mounted substantially from the front face 70 of the claw-pole plate 22, 23 axially into the interstices, the further, second embodiment of the resiliently embodied holding element 60 proposed according to the invention can be snapped in the radial direction, i.e. from the periphery, into the interstices of said claw-pole plate 22, 23.

Figure 20:
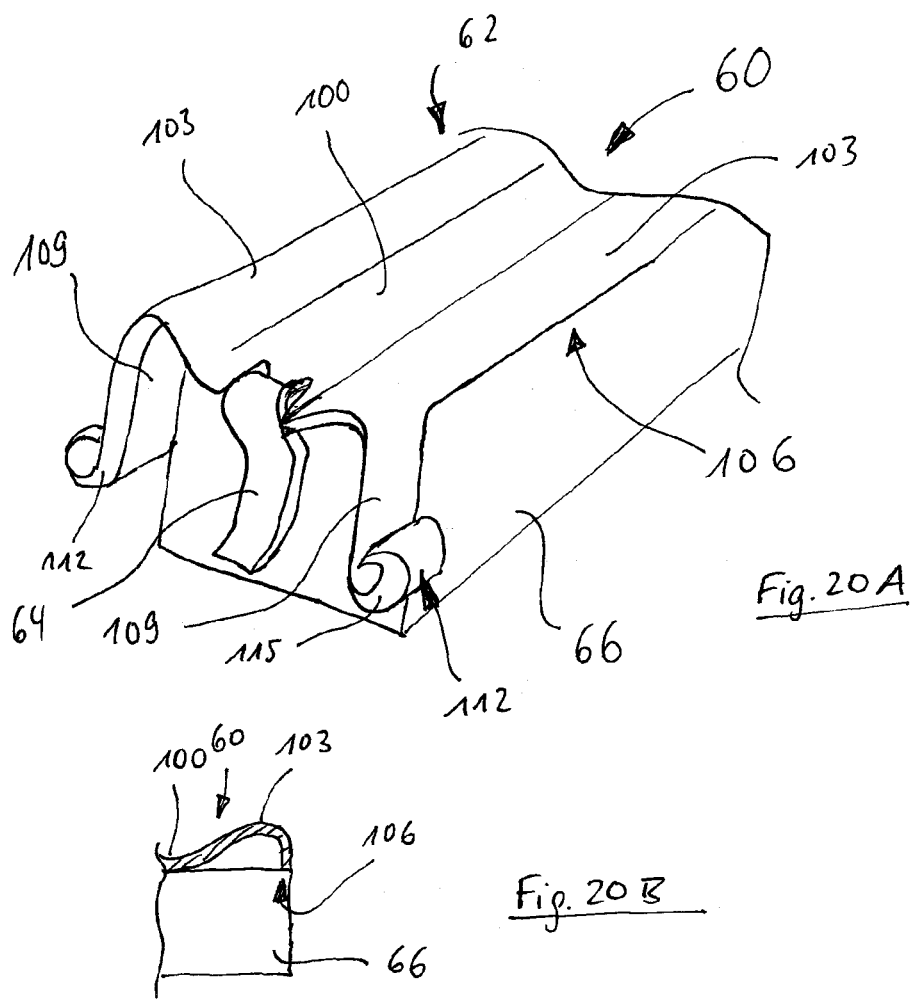

In FIG. 20A, a holding element 60 is depicted from non- or practically non-magnetic sheet metal or sheet steel, which has a wave-shaped 62 profile running transversely to the longitudinal direction of the interstice 74. The direction considered in this instance to be a longitudinal direction runs substantially parallel to the flanks of the claw-pole fingers 24. A wave trough 100, whereat the permanent magnet 66 is supported on the radially outwards oriented top face thereof, is centrally located above said permanent magnet 66. Corrugated ribs 103 profiled in the longitudinal direction, which have an edge 106 oriented radially inwards and on which said permanent magnet 66 is supported, are situated on both sides of this wave trough 100. Tension rods 109 integrally formed on these corrugated ribs 103 and which run substantially radially inwards are situated in the longitudinal direction on both sides of said permanent magnet 66. In the longitudinal direction at all fours corners of said permanent magnet 66, said tension rods 109 prevent said permanent magnet 66 from displacing in the longitudinal direction relative to themselves. The holding collars 112 are in each case bent away from said permanent magnets 66 such that said collars have a substantially round profile in the longitudinal direction. Each two holding collars 112 on one longitudinal side of the permanent magnet 66 extending in the longitudinal direction align with each other and are inserted in a pole groove 92 of a claw-pole finger 24, which is not depicted here. In order to facilitate the insertion into the two respective oppositely polarized pole grooves 92, the holding collars 112 are provided with a chamfer 115. A clamping bracket 64, which with a clamping bracket 64, which is oppositely positioned in the longitudinal direction, clamps a permanent magnet 66 between them, is situated in each case between two holding collars 112 disposed adjacently in the peripheral direction.

Figure 21:
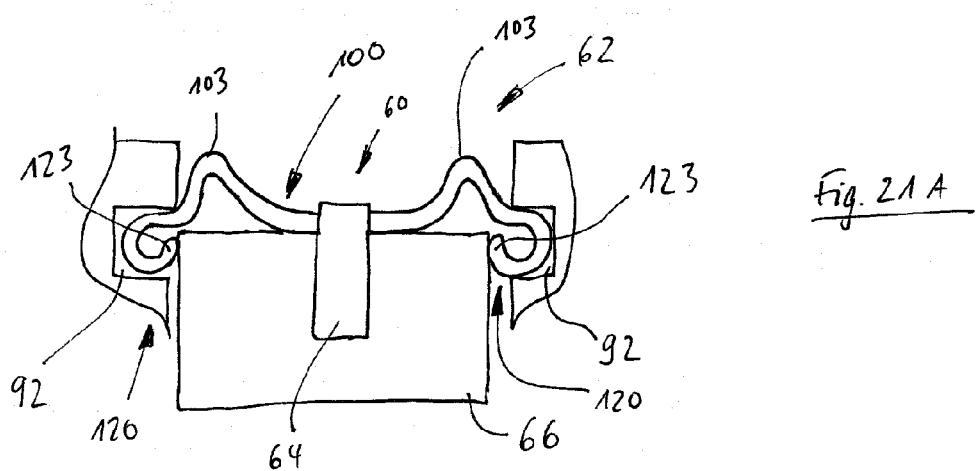
Figure 21:
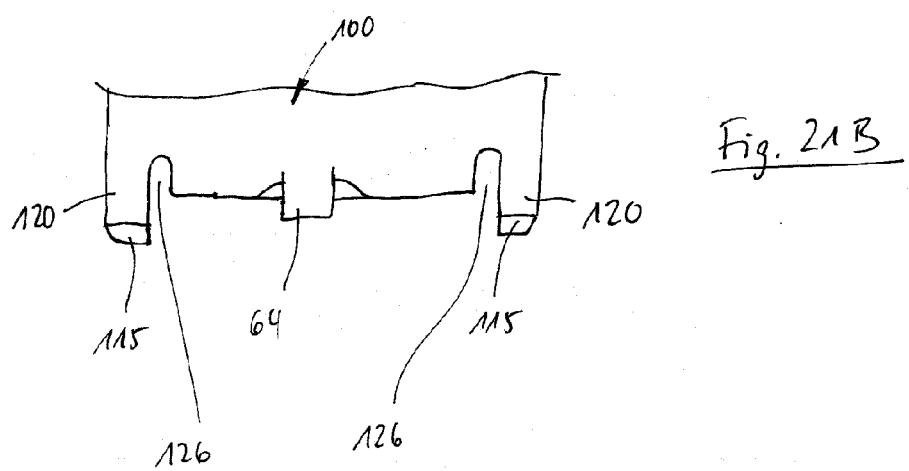

In FIG. 21A, a holding element 60 is depicted from non- or practically non-magnetic sheet metal or sheet steel, which likewise has a wave-shaped 62 profile running transversely to the longitudinal direction of the interstice 74. The direction considered in this instance to be a longitudinal direction runs substantially parallel to the flanks of the claw-pole fingers 24. A wave trough 100, whereat the permanent magnet 66 is supported on the radially outwards oriented top face thereof, is centrally located above said permanent magnet 66. Corrugated ribs 103 profiled in the longitudinal direction, which merge into a holding roller 120, are situated on both sides of this wave trough 100. The holding rollers 120 and the holding element 60 are embodied as one piece. Said holding rollers 120 are wound in such a way that a winding end 123 abuts against said permanent magnet 66, wherein the holding roller 120 is disposed in a pole groove 92 between a winding end 123 and the corrugated rib 103. Said holding element 60 is supported on both sides in each case by a holding roller 120 in a respective pole groove 92. In order to facilitate insertion, each holding roller 120 is provided with a chamfer 115 on the end faces thereof. A clamping bracket 64, which with a clamping bracket 64, which is oppositely positioned in the longitudinal direction, clamps a permanent magnet 66 between them, is situated in each case between two holding rollers 120 disposed adjacently in the peripheral direction. In order to reduce load peaks, a slot 126 is introduced between a holding roller 120 and a wave trough 100. Each holding roller 120 runs preferably parallel to an edge of a block-shaped permanent magnet 66.

Figure 22:
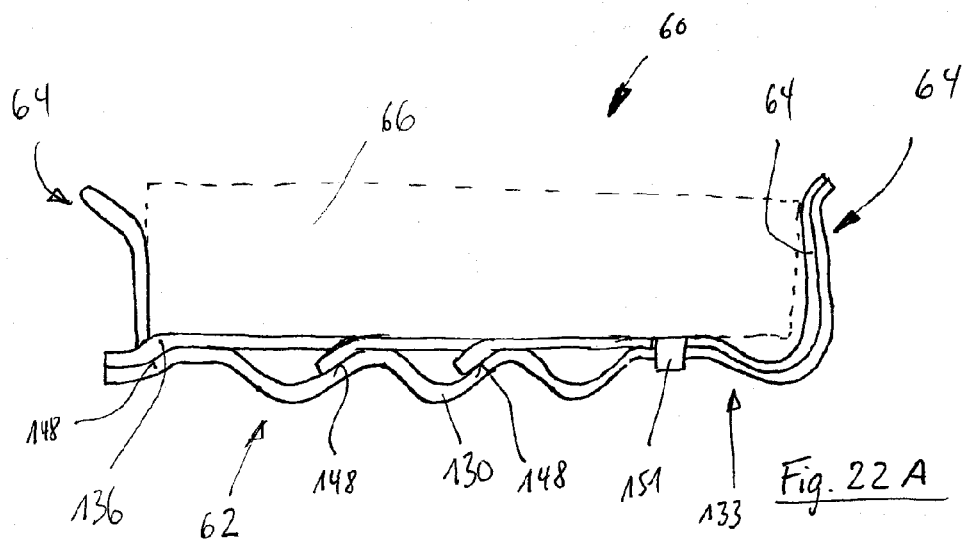
Figure 22:
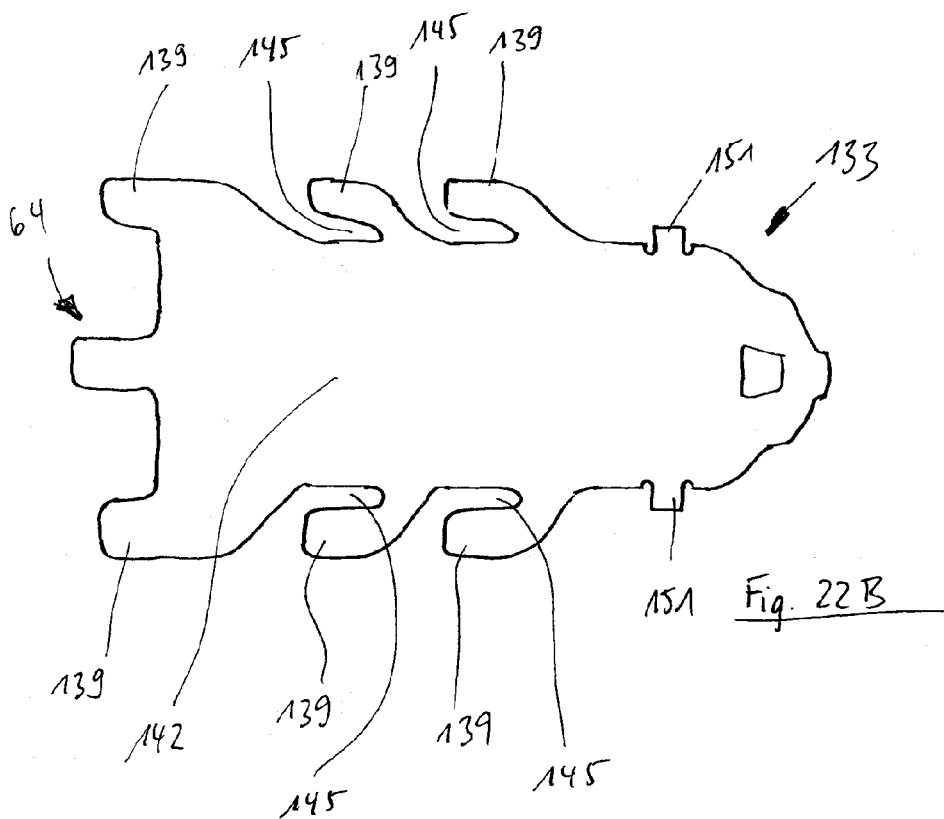

In FIG. 2A, a side view of another holding element 60 from non- or practically non-magnetic sheet metal or sheet steel is depicted, which likewise has a wave-shaped 62 profile in the longitudinal direction of the interstice 74. The holding element 60 consists of two parts, which fit snugly together at various locations. On the one hand, said holding element 60 consists of a top part 130, which has the wave-shaped 130 profile and a clamping bracket 64 at each end. In order to facilitate insertion, the top part 130 is provided with a taper, which facilitates an insertion into the pole grooves 92. A bottom part 136, also see FIG. 22B, is situated between the top part 130 and the permanent magnet 66. On each side, respectively three arms 139 go out from this bottom part 136, which point away from a taper 133 that is also provided on said bottom part 136. A slot 145 is located between an arm 139 and a planar main body 142, whereat the permanent magnet 66 is supported during operation. The arms 139 fit snugly against wave-shaped flanks 148 in the state where said top part 130 is connected and thus cause a damping friction between said top part 130 and said bottom part 136, which counteracts vibrations and relative movements. Two lugs 151 going out from said bottom part 136 in the region of the taper 133 laterally enclose said top part 130 so as to face each other; thus enabling said top part 130 and said bottom part 136 to be connected to one another. If applicable, said bottom part 136 optionally includes a clamping bracket 64, which, for example, is fitted to the form of the one clamping bracket 64 of said top part 130. Both clamping brackets 64 of said top part 130 and said bottom part 136, which are disposed at one end of said permanent magnet 66, preferably press jointly against the one end of said permanent magnet 66.

A further holding element 60 is depicted in FIG. 23. This holding element 60 is created by original molds and consists, for example, of a preferably fiber-reinforced thermoplastic or thermosetting plastic. Said holding element 60 has likewise a wave-shaped 62 profile running transversely to the longitudinal direction of the interstice 74. The direction considered in this instance to be a longitudinal direction runs substantially parallel to the flanks of the claw-pole fingers 24. A wave trough 100, whereat the permanent magnet 66 is supported on the radially outwards oriented top face thereof, is centrally located above said permanent magnet 66. Profiled corrugated ribs 103, which merge into an angle bracket 150 are situated on both sides of this wave trough 100 in the longitudinal direction. The angle brackets 150 and said holding element 60 are embodied as one piece and engage in each case in one of the pole grooves 92. Said holding element 60 is bilaterally supported by a respective angle bracket 150. Bays 153 extend out from the wave trough 100, which have a planar base and abut there against one side 159 of said permanent magnet 66. In each case, two bays 153 extend from said wave trough 100 in the direction of a pole groove 92. Said permanent magnets 66 are engaged behind on their end faces 162 by snap-in hooks 165 integrally connected to said holding element 60 and are thereby connected to said holding element 60. Holding arms 168, which are considerably more pliably embodied than other regions of said holding element 60, extend out from said angle brackets 150 in the alignment direction (pole groove 92). Holding lugs 171 are situated on the ends of the holding arms 168, which by means of a mating flange surface 174 ensure a fixed position of said holding element 60 with the permanent magnet 66 in the pole grooves 92. The holding arm 168 still engages in the pole groove 92 while the mating flange surface 174 is abutting snugly against a lateral surface of a claw-pole root. The position of the holding element 60 and consequently that of the permanent magnet 66 is definitely secured by this snug abutment against the claw-pole roots. The pole groove 92 comes to a stop in the lateral surface of the claw-pole root.

What is claimed is:

1. An electric machine (10), comprising an exciter system composed of a plurality of electrically excited salient poles within a stator (16) or rotor (20) in the form of electromagnetically excited poles (22, 23; 24, 25), which are axially oriented on a periphery and are alternatively polarized in a peripheral direction, for increasing performance by additional magnetic field strength and comprising permanent magnets (66), which are inserted into interstices (74) between the alternating poles (24, 25), wherein said permanent magnets (66) increase performance by additional magnetic field strength and reducing magnetic flux leakage and which are secured by magnetically non-excitable holding elements (60), each of which is bilaterally mounted in pole grooves (92, 94), characterized in that each holding element (60) is resilient and has a wave-shaped (62) profile along a direction transverse to a longitudinal direction of the holding element (60), wherein the holding element (60) is held by holding collars (112) that are bent away from the permanent magnet (66) such that said holding collars (112) have a substantially round profile when viewed along the longitudinal direction and said holding collars (112) are inserted into the two respective oppositely polarized pole grooves (92) along the longitudinal direction.

2. The electric machine (10) according to claim 1, wherein the holding elements (60) further include clamping brackets (64) for fixation of the permanent magnets (66).

3. An electric machine (10), comprising an exciter system composed of a plurality of electrically excited salient poles within a stator (16) or rotor (20) in the form of electromagnetically excited poles (22, 23; 24, 25), which are axially oriented on a periphery and are alternatively polarized in a peripheral direction, for increasing performance by additional magnetic field strength and comprising permanent magnets (66), which are inserted into interstices (74) between the alternating poles (24, 25), wherein said permanent magnets (66) increase performance by additional magnetic field strength and reducing magnetic flux leakage and which are secured by magnetically non-excitable holding elements (60), each of which is bilaterally mounted in pole grooves (92, 94), characterized in that each holding element (60) is resilient and has a wave-shaped (62) profile along a direction transverse to a longitudinal direction of the holding element (60), wherein the holding element (60) is held by holding rollers (120) which are bent toward the permanent magnet (66) such that said holding rollers (120) have a substantially round profile when viewed along the longitudinal direction, and said holding rollers (120) are inserted into the two respective oppositely polarized pole grooves (92) along the longitudinal direction.

4. The electric machine (10) according to claim 3, wherein the holding elements (60) further include clamping brackets (64) for fixation of the permanent magnets (66).

* * * * *